United States Patent [19]

Brunner et al.

[11] Patent Number: 4,796,283
[45] Date of Patent: Jan. 3, 1989

[54] SURGE COUNTER FOR AN OVERVOLTAGE ARRESTER

[75] Inventors: Kurt Brunner, Rüti; Rudolf Fischer, Riedt bei Neerach; Klaus Giese, Neuenhof, all of Switzerland

[73] Assignee: BBC Brown, Boveri Ltd., Baden, Switzerland

[21] Appl. No.: 27,549

[22] Filed: Mar. 18, 1987

[30] Foreign Application Priority Data

Apr. 9, 1986 [CH] Switzerland ............... 1391/86

[51] Int. Cl.⁴ .................. H02H 3/04; H02H 9/04; G06M 3/00
[52] U.S. Cl. ........................... 377/6; 377/12; 361/86; 361/91; 307/130
[58] Field of Search ............... 377/6, 12; 361/86, 88, 361/91; 307/130

[56] References Cited

U.S. PATENT DOCUMENTS 4,605,981 8/1986 Huvet et al. ................... 361/91
4,628,396 12/1986 Flemming ..................... 361/91

FOREIGN PATENT DOCUMENTS 190547 8/1986 European Pat. Off. .
1588142 9/1970 Fed. Rep. of Germany .
2374783 6/1978 France .

OTHER PUBLICATIONS

Breder et al., "Supervision of Gapless Zinc-Oxide Surge Arresters" Conference on Lightning+Power Systems, London, 1984 (Conference Publision No. 236, IEE).

Primary Examiner—John S. Heyman
Attorney, Agent, or Firm—Burns, Doane, Swecker & Mathis

[57] ABSTRACT

A device for counting the overvoltage surges discharged by a gapless overvoltage arrester contains a sensing head and a counting mechanism which follows the sensing head. In the sensing head, the discharge current carried by the overvoltage arrester in a ground return line during the occurrence of an overvoltage surge is detected. The counting mechanism records an overvoltage surge as soon as the discharge current exceeds a threshold value. During this process, an effective connection between the sensing head and a counter is established for a brief time by means of a switch. This device is intended to be characterized, with a high counting accuracy, by a dead time which is independent of the components used. This is achieved by the measure that the switch is followed by a threshold detector which responds above the threshold value of the discharge current. This threshold detector acts both on the counter and on a control member, such as a monostable multivibrator, which switches the switch off after the threshold detector has responded and holds it in the switched-off position during a predetermined period which is essentially determined by the duration of the overvoltage surge.

9 Claims, 3 Drawing Sheets

SURGE COUNTER FOR AN OVERVOLTAGE ARRESTER

BACKGROUND OF THE INVENTION

The invention relates to a device for counting overvoltage surges discharged by a gapless overvoltage arrester.

Such a surge counter has been published in an article by Breder et al. "Supervision of Gapless Zinc-Oxide Surge Arresters" Conference on Lightning+Power Systems, London 1984 (conference Publication No. 236, IEE). In the gapless overvoltage arrester described in this article, overvoltage surges are detected by means of a sensing head which detects the discharge current carried in a ground return line of the overvoltage arrester. The sensing head is followed by a counting mechanism which contains a counter which records the number of overvoltage surges and a switch which precedes the counter. Above a threshold value of the discharge current, this switch establishes for a brief time an effective connection between the sensing head and the counter. This makes it possible to detect each overvoltage surge accurately. However, the timing sections used in this connection are comparatively expensive and have a dead time which is dependent on the time characteristic of the discharge current.

As noted in the Breder et al. paper, a device for counting overvoltage surges permits monitoring of possible surge arrester degradation. Although gapless overvoltage arresters have proven fairly reliable, it is advisable to count the number of overvoltage surges since each overvoltage surge may cause a small degree of degradation of non-linear metal oxide resistors provided within the gapless overvoltage arrester.

BRIEF SUMMARY OF THE INVENTION

The present invention is based on the object of creating a device for counting the overvoltage surges discharged by a gapless overvoltage arrester which, with a high counting accuracy, is distinguished by a dead time which is independent of the components used.

The counting device according to the invention is highly sensitive since it is constructed as an active counter and takes almost no energy from the measured signal of the discharge current. The active electronics used in the counting device provide an accurately adjustable and reproduceable dead time so that, seen overall, high counting accuracy is achieved.

BRIEF DESCRIPTION OF THE DRAWING

In the text which follows, an illustrative embodiment of the invention is shown with the aid of the drawing, in which.

DETAILED DESCRIPTION OF THE PREFERRED EMBODIMENT

Figure 1:
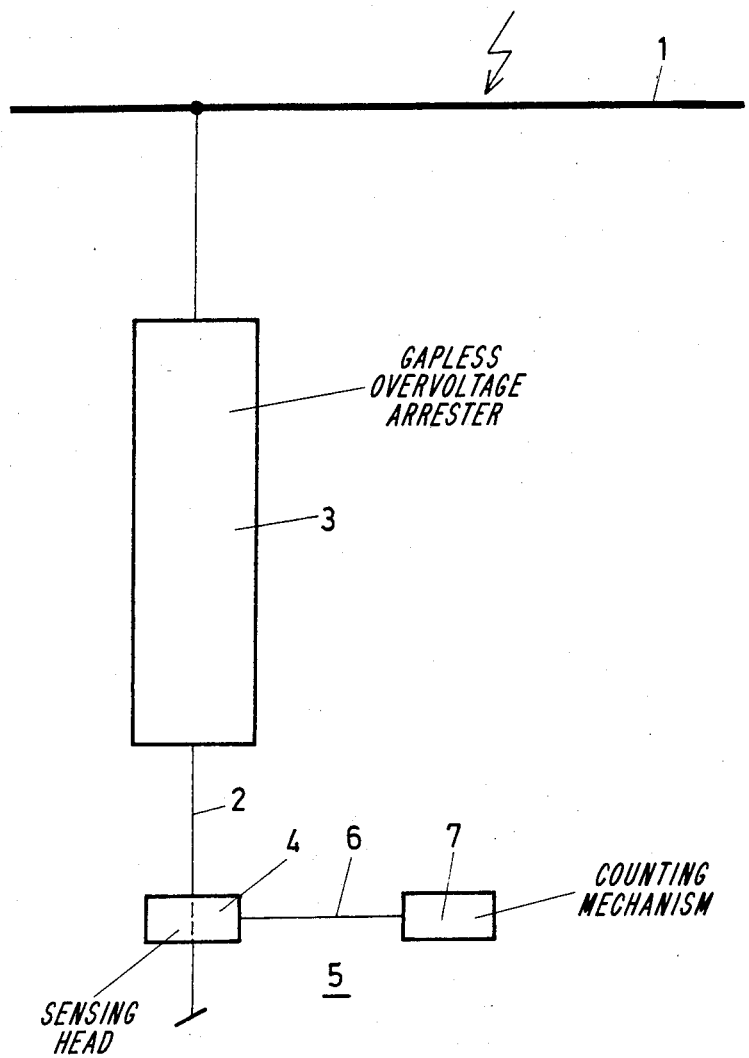
FIG. 1 shows the basic configuration and the basic arrangement of a device for counting the overvoltage surges discharged by a gapless overvoltage arrester in accordance with the invention.

Referring to FIG. 1, reference number 1 designates a high-voltage line and reference number 2 designates a ground return line between which lines a gapless overvoltage arrester 3 is connected which is preferably constructed of a stack of non-linear metal oxide resistors. The ground return line 2 is surrounded by a sensing head 4 of a device 5 for counting the overvoltage surges discharged by the gapless overvoltage arrester 3. The sensing head 4 acts on a counting mechanism 7 via a signal line which is preferably constructed as an optical conductor 6.

Figure 2:
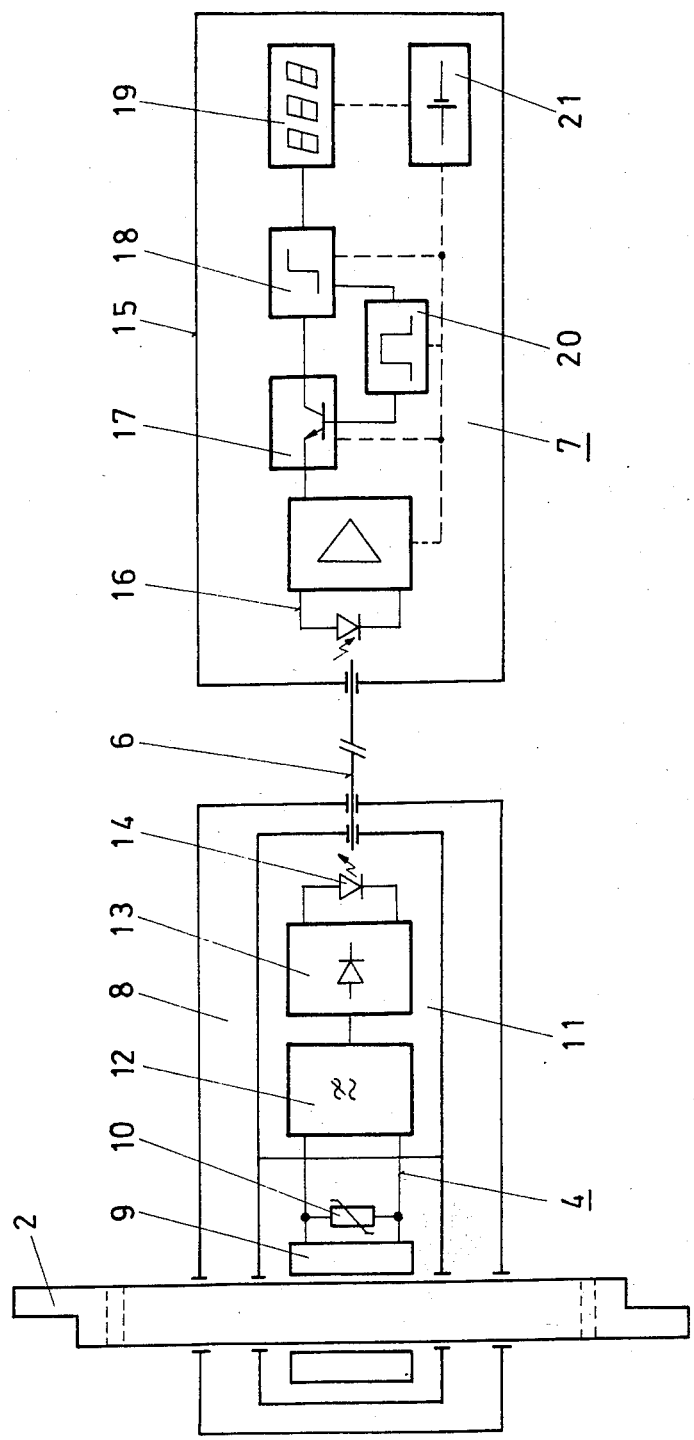
FIG. 2 shows a block diagram of an embodiment of the device according to FIG. 1.

As can be seen from FIG. 2, the sensing head 4 is located in an electro-magnetically tight housing 8 which preferably consists of several shells. The sensing head 4 contains a sensing member which is constructed, for example, as an inductive transducer 9 and is protected by an overload protector 10 and the output signal of which is passed into a subhousing 11 which is contained in the housing 8 and is additionally electro-magnetically shielded. In the subhousing 11, it is passed via a filter element 12 and a rectifier 13 to an electro-optical transducer preferably constructed as light-emitting diode 14.

The optical signal formed in the light-emitting diode 14 passes via the optical conductor 6 into a housing 15 which also acts as electro-magnetic shielding and which accommodates the counting mechanism 7. The optical signal is there converted into an electrical signal in an opto-electric transducer 16. This signal passes via a controllable and normally closed switch 17 to a threshold detector 18 the pulse-shaped output signal of which, on the one hand, is recorded by a counter 19 and, on the other hand, acts on a control element 20 which is preferably constructed as monostable multivibrator. The control element, in turn, acts on a control member of the switch 17. Electro-optical transducer 16, switch 17, threshold detector 18, counter 19 and monostable multivibrator 20 are supplied with energy by a voltage source preferably constructed as a lithium-based battery 21 and are cast in a compound of synthetic material for protection against environmental influences. Electro-optical tranducer 16, switch 17, threshold detector 18, counter 19 and monostable multivibrator 20 are designed for very low quiescent currents and only load the battery 21 during a measuring process.

Instead of a transmission unit consisting of electro-optical transducer, optical conductor and opto-electrical transducer, an integrated optocoupler can also be used. This is of advantage particularly when the ground return line 2 is easily accessible. The sensing head and counting mechanism can then be easily installed in a single housing. In contrast, it is recommended to use an optical conductor if the ground return line is not easily accessible. This can occur in the case of metal-encapsulated gas-insulated overvoltage arresters which are mounted upside down. In such a case, the ground return line is at a height of 5 to 10 meters above the ground. To enable the surge counter to be easily read with such an overvoltage arrester, the optical conductor 6 represents a suitable possibility. The signal of the discharge current determined at the sensing head can be conducted free of electro-magnetic disturbances to a remote location, for example a control room.

Figure 3:
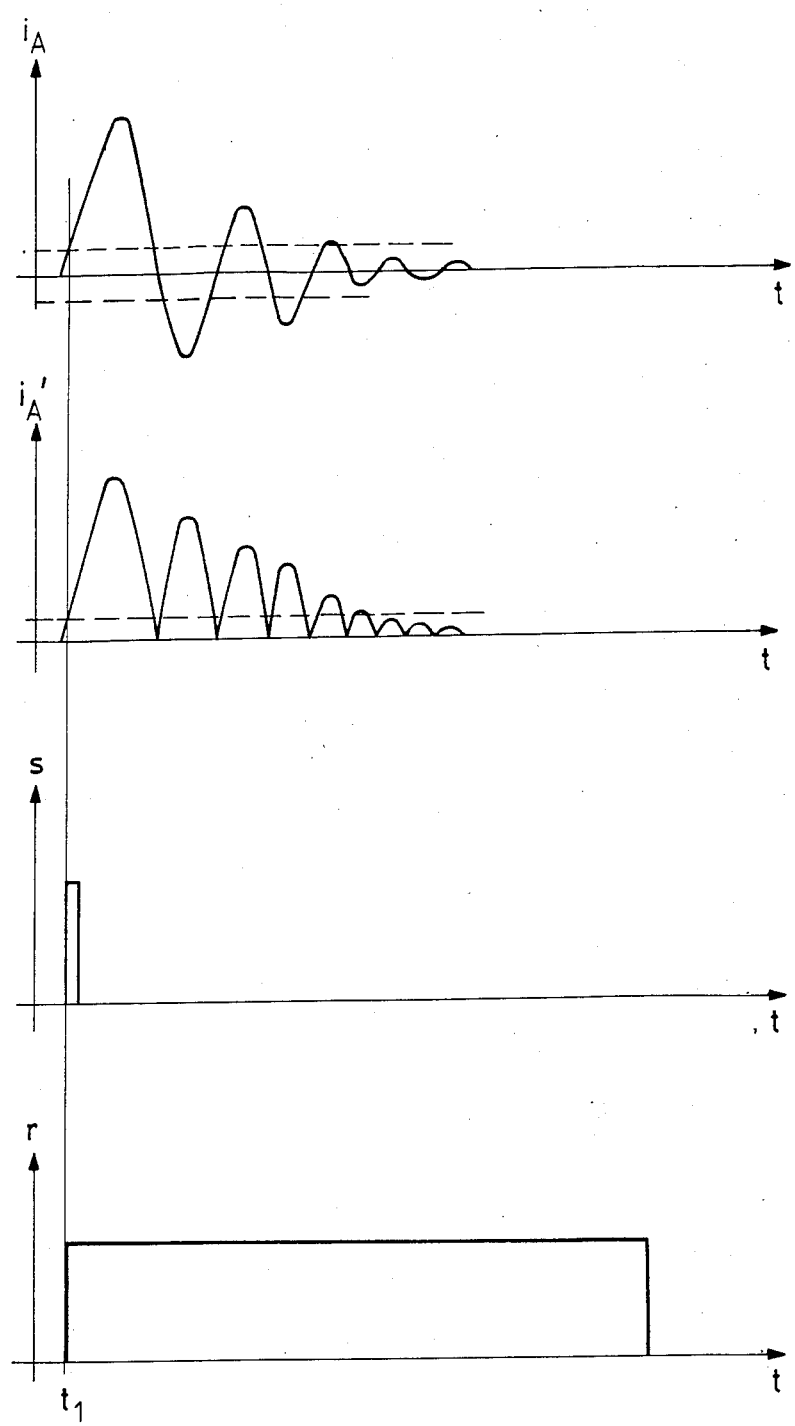
FIG. 3 shows the variation with time of signals which are detected or formed by the device according to FIG. 1 during the discharging of an overvoltage surge.

The device shown in FIGS. 1 and 2 operates as follows: If an overvoltage surge (shown by a zagged arrow in the figure) occurs on the high-voltage line 1 shown in FIG. 1 and protected by the overvoltage arrester, the overvoltage arrester 3 forms a discharge current $i_A$ which is removed through the ground return line 2 and the variation of which as a function of time t is shown in FIG. 3. Such a discharge current typically oscillates for a short time with a frequency dependent on the high-voltage line 1 so that several surge currents in rapid succession can result from a single overvoltage surge.

The discharge current $i_A$ detected by the sensing head 4 and consisting of several surge currents is converted in the sensing head 4 into an optical signal, $i_A'$ the variation of which with time is also shown in FIG. 3.

If then the discharge current $i_A$ exceeds a threshold value, shown dashed in FIG. 3, at a time $t_1$, the optical signal $i_A'$ also exceeds a limit value drawn dashed in FIG. 3 and, correspondingly, also the electrical signal acting on the threshold detector 18 and converted back from the optical signal. The threshold detector 18 emits at time $t_1$ the signal s shown in FIG. 3 which increments the counter 19. At the same time, the threshold detector 18 acts on the monostable multivibrator 20. The monostable multivibrator 20 emits, also at time $t_1$, a signal (designated by r in FIG. 3) which acts on a control member of the switch 17 and opens the switch 17. The period of the signal emitted by the monostable multivibrator 20 is comparatively long and holds the switch 17 open until the discharge current $i_A$ has largely decayed. This prevents in a simple manner the current surges formed by the overvoltage arrester within a single overvoltage surge from being counted separately.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. A device for counting overvoltage surges detected by a gapless overvoltage arrester having a sensing head surrounding a ground return line of said overvoltage arrester for detecting a discharge current carried by said overvoltage arrester during the occurrence of an overvoltage surge and a counting mechanism to which is applied a first signal responsive to said discharge current; said counting mechanism comprising:
   a switch;
   a threshold detector to which said first signal is applied through said switch, said threshold detector operative to generate a second signal when said first signal exceeds a threshold value;
   a counter responsive to said second signal for recording the number of overvoltage surges, said counter being incremented by each occurrence of said second signal; and
   a control element responsive to said second signal, said control element opening said switch in response to said second signal and maintaining said switch in an open position during a predetermined period, said first signal being disconnected from said threshold detector when said switch is in an open position.

2. A device as claimed in claim 1, wherein said control element is a monostable multivibrator.

3. A device as claimed in claim 1, wherein said switch, said threshold detector and said control element include active electric components and are supplied with electrical energy from a common voltage source.

4. A device as claimed in claim 3, wherein the control element is a monostable multivibrator and the switch is a transistor.

5. A device as claimed in claim 4, wherein said counting mechanism includes electronic components which are encased in a synthetic compound.

6. A device as claimed in claim 1, wherein the counting mechanism is housed in an electromagnetically shielded housing.

7. A device as claimed in claim 6, wherein the sensing head is connected with the counting mechanism by an optical conductor.

8. A device as claimed in claim 1, wherein the sensing head and the counting mechanism are housed in a common housing.

9. A device as claimed in claim 1, wherein the sensing head is housed in an electromagnetically shielded housing.

* * * * *